United States Patent Office 2,763,165
Patented Sept. 18, 1956

2,763,165

AUTOMATIC TRANSMISSION AND SPEED CHANGING MECHANISM

Francisco Baschet, Buenos Aires, Argentina

Application October 23, 1951, Serial No. 252,615

5 Claims. (Cl. 74—752)

The present invention refers to a novel automatic transmission and speed changing mechanism.

One of the fundamental features of the invention consists in the fact that two shafts (driving and driven shafts) are placed one after the other, one of them terminating in a pinion that meshes with another multiple pinion arranged around a shaft integral with the second and arranged perpendicularly thereto, the said multiple pinion meshing, in turn, with one or more toothed wheels rotating on individual bearings and being provided with stopping or braking means.

However, it being a matter of indifference which one of the main shafts mentioned in the foregoing paragraph is the driving shaft, it will be assumed, in order to make the specification clearer, that the driving shaft is the one provided with a simple pinion, i. e., that the shaft provided with the complementary shaft at right angles thereto and on which the multiple pinion moves, is to be the driven shaft.

The operation of the device described above is as follows: The turning of the driving shaft is directly transmitted to the multiple pinion, which, should all the toothed wheels be free, will turn itself without transmitting its motion to the driven shaft, but will do otherwise if any of the toothed wheels is braked. In this latter case, the number of turns transmitted to the driven shaft at each turn of the driving shaft will depend, substantially, on the ratio between the number of teeth on the toothed wheel that is braked and the number of teeth of the sector of the multiple pinion that meshes therewith.

Another important feature of the novel transmission mechanism consists in the fact that it takes advantage of the various forces to which the toothed wheels are subjected, for the building up of an automatic device for the change of speed. Essentially, this characteristic of the invention is based on the principle that when the transmission is effected according to a slight speed decreasing extent, the braking means for the corresponding toothed wheel absorbs a force superior to the normal force, and vice versa.

Still another feature of the invention resides in the application of complementary means that convert the increase in the turning speed of the driving shaft into a modification of the normal absorption values of forces on the part of the braking means referred to in the foregoing paragraph.

Other characteristics and constructive details of the present invention will be apparent with reference to the drawings that accompany the present specification and claims, which show some of the preferred forms of carrying the fundamental idea of the invention into effect, and which may be varied without departing from the scope of the invention. Reference will be had to the above mentioned illustrative matter in the following, with the object of clarifying the statements made and at the same time to demonstrate the practicality of the invention.

Figure 1:
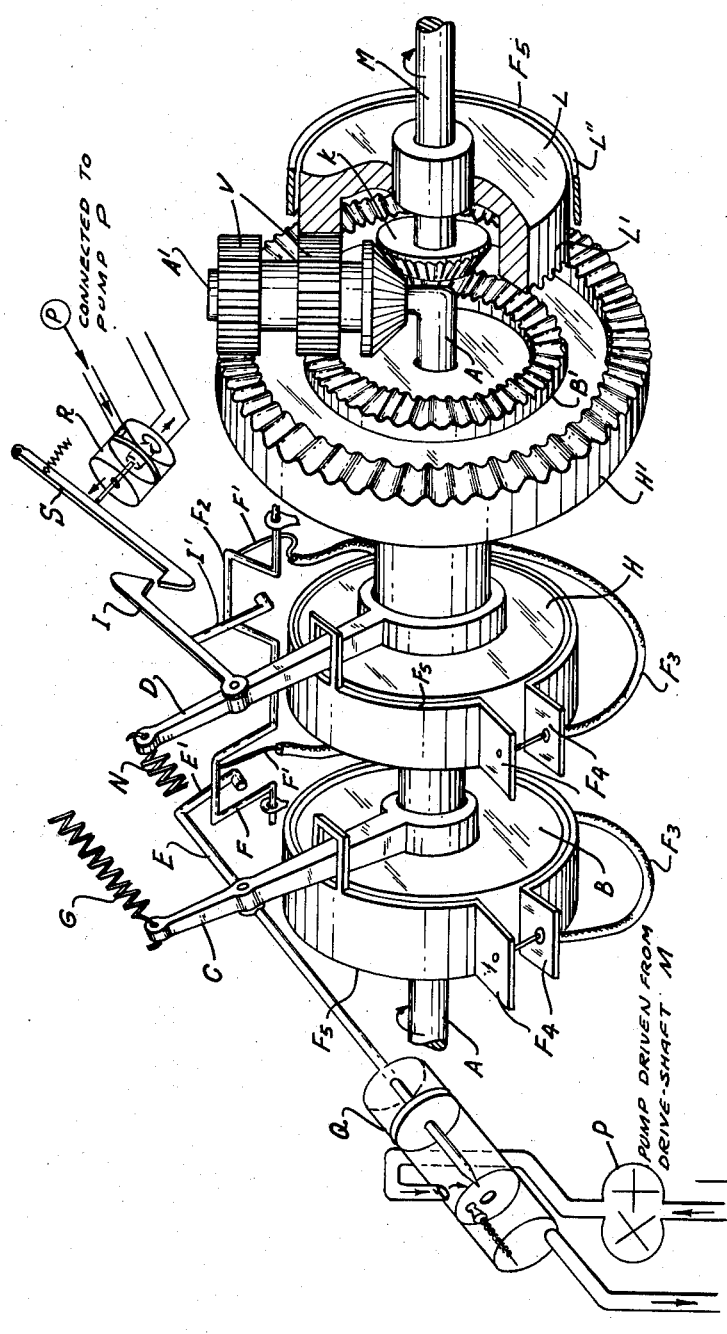
Fig. 1 shows a speed changing mechanism constructed according to the present invention, and in which the complementary mechanism for the adjustment of the automatic device as a function of the driven shaft speed, is of hydraulic type.

Both cases shown have in common the following elements:

Driving shaft M, secured to plain pinion K;

Driven shaft A secured to complementary shaft A', on which turns the integrally constructed multiple pinion V;

Slow speed toothed wheel H' secured to drum H and its respective brake H connected to the coupling arm D;

High speed toothed wheel B' secured to drum B and its respective brake B connected to the coupling arm C;

Toothed wheel L' used for reverse action, secured to drum L and its respective brake L".

It will be clearly understood by examining the drawings, that by turning the driving shaft M at a constant speed, and according to how individually and separately braking action is applied through brakes H, B, or L, the driven shaft A will rotate at a low speed, high speed or reverse respectively, taking into account that the three brakes (bands) are connected to a fixed point. In the case that the three brakes are loose and the driven shaft offers some resistance to rotate, an unclutching effect of the transmission will take place.

The crank lever F is the member responsible for actuating both brakes H and B, and is driven by the two coupling rods E and I, pivoted to coupling arms C and D respectively, which are urged towards rest positions by means of springs G and N respectively.

As can be seen in the drawings, the brake means B are shown in a tensioned condition, and brake means H in an untensioned condition. Coupling arms E and I are respectively provided with extensions E' and I' at right angles thereto. Portions $F_1$ and $F_2$ are respectively connected through connecting means or braking cables F', which constitute part of Bowden cables, to the flanges $F_4$ of the brake shoes $F_5$ of the brakes B and H. As can be seen in the drawings, one end of each of the connecting means or brake cables F' is respectively connected to one of the flanges $F_4$, so that when the other end of each of the cables F' is tensioned due to turning of the crank F, flanges $F_4$, each projecting at right angles from respective brake shoes $F_5$, will be pulled towards one another so as to apply a braking action on the drums B and H respectively. It is to be noted that the movement of extension I', in a clockwise direction as seen in the drawings turns the crank portion $F_2$, so as to untension the cable F' connected to crank portion $F_2$ and to release brake H, and this movement at the same time turns crank portion $F_1$ in a clockwise direction as viewed in the drawings, thus tensioning the cable F' attached to crank portion $F_1$ and applying the brake B. It will be seen, with reference to the above discussion, that the movement of coupling arm C and extension E' in a counterclockwise direction as viewed in the drawings when the drum of brake B slips due to a large torque exerted on the brake drum of brake B in the high speed condition of the mechanism, will cause crank portion $F_1$ to move in a counterclockwise direction and thus untension cable F' and release the brake B. At the same time this movement will also turn crank portion $F_2$ in a counterclockwise direction and apply brake H. Obviously, the reverse procedure is equally applicable.

If it is assumed that the transmission mechanism is in the "high speed" condition (brake B applied), it will be easy to understand that the coupling arm C will be subjected to a torque transmitted by brake B in opposition to the action of spring G. When such torque exceeds a predetermined value, coupling arm C will shift coupling rod E, and the latter through extension E' will actuate crank F releasing brake B. Brake H will go then into operation, and thereby the transmission mechanism will change to the "low speed" condition. Conversely, when the mechanism is in the "low speed" condition and the force transmitted by brake H to coupling arm D in opposition to the action of spring N is lower than some other predetermined value, spring N will shift arm D and coupling rod I through extension I' will turn crank shaft F to the "high speed" condition. What has been said gives rise to an automatic speed changing mechanism.

In Fig. 1 is shown a complementary hydraulic mechanism for automatic adjustment of the driven shaft speed, which is constituted essentially by a pair of servomotors Q and R into which respective oil streams delivered by pump P, flow, this pump being acted upon by a branch of the driving shaft M. The pressure on the rods E and S depends, consequently, on the speed of the driving shaft M. This is converted into an increase in the predetermined value of the force of coupling arm C, which is required for the actuation of crank lever F, for the "automatic device" to be transferred from "high speed" to "low speed." And in the case of coupling arm D and coupling rod I, the latter are locked through lever S for preventing the operation of crank lever F when the driving shaft M turns at a high number of turns.

Figure 2:
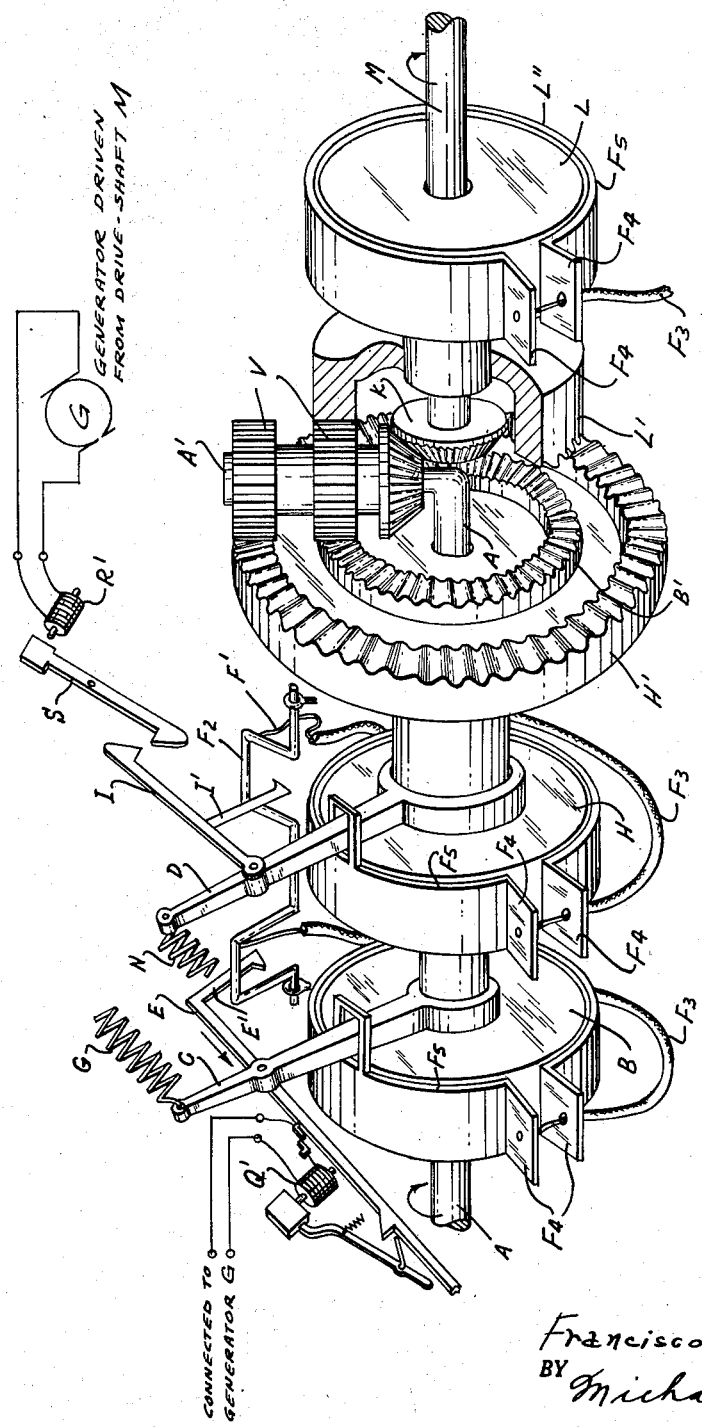
Fig. 2 shows a speed changing mechanism equivalent to that of the former figure, wherein the regulating complementary mechanism is of the electromagnetic type.

The complementary regulating mechanism shown in Fig. 2 operates in an analogous manner, except that instead of the two cylinders Q and R, two electromagnets Q' and R' are used, both energized by a generator that is operated by the driving shaft M, the attraction force of both electromagnets which constitute servomotors depends upon the number of turns in the generator.

Each of the brake means B, H is held in its position against the action of the springs G and N by the force exerted by the servo-motors Q and R, or by the electromagnetic servo-motors Q' and R'. The pump P and the generator which energizes the electromagnets Q', P' are connected for rotation to the drive shaft M so that the force acting on the coupling means, namely on the arms C and D, and the rods E and I, S corresponds to the rotary speed of the drive shaft. The brake actuating means, namely the crank shaft F and the connecting means F' connecting each of the cranks of the crank shaft F with one of the brake means, are turnable between a plurality of positions, and actuate in each of the positions one of the brake means, while the other brake means release the toothed wheels B' and H', respectively. Therefore the servo-motors will hold through the coupling means C, E the brake actuating means in the brake actuating position until a change of the speed of the drive shaft reduces, or increases, the force of the servo-motors so that the coupling means are released by the springs G, N.

It will be understood that each of the elements described above, or two or more together, may also find a useful application in other types of speed changing mechanism, differing from the types described above.

While the invention has been illustrated and described as embodied in an automatic transmission and speed changing mechanism, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalency of the following claims.

What is claimed as new and desired to be secured by Letters Patent is:

1. An automatic transmission and speed changing mechanism, comprising, in combination, a drive shaft; a driven shaft; differential gear means connecting said drive shaft with said driven shaft and including a plurality of freely rotatable toothed wheels for changing the speed of said driven shaft; brake means connected to each of said toothed wheels; brake actuating means movable between a plurality of positions and actuating in each of said positions one of said brake means while releasing the others of said brake means; a plurality of coupling means, each coupling means connected to one of said brake means and being movable with the same between a coupling position engaging said brake actuating means, and a releasing position releasing said brake actuating means, each of said coupling means shifting in said coupling position said brake actuating means into a position for actuating the brake means associated with the respective coupling means; means constantly urging said coupling means into said releasing positions; and a plurality of servo-motor means, each of said servo-motor means being connected to one of said coupling means for moving the same to said coupling position, said servo-motor means being connected to said drive shaft so as to exert on the respective coupling means a force depending on the rotary speed of said drive shaft.

2. An automatic transmission and speed changing mechanism, comprising, in combination, a drive shaft; a first gear fixed to said drive shaft for rotation therewith; a driven shaft; an arm fixedly connected to said driven shaft extending therefrom, and being perpendicular thereto; a second gear and a plurality of additional gears fixedly connected to each other and being freely turnable on said arm, said second gear meshing with said first gear; a plurality of toothed wheels respectively meshing with said plurality of additional gears; brake means connected to each of said toothed wheels; brake actuating means movable between a plurality of positions and actuating in each of said positions one of said brake means while releasing the others of said brake means; a plurality of coupling means, each coupling means connected to one of said brake means and being movable with the same between a coupling position engaging said brake actuating means, and a releasing position releasing said brake actuating means, each of said coupling means shifting in said coupling position said brake actuating means into a position for actuating the brake means associated with the respective coupling means; means constantly urging said coupling means into said releasing positions; and a plurality of servo-motor means, each of said servo-motor means being connected to one of said coupling means for moving the same to said coupling position, said servo-motor means being connected to said drive shaft so as to exert on the respective coupling means a force depending on the rotary speed of said drive shaft.

3. An automatic transmission and speed changing mechanism, comprising, in combination, a drive shaft; a first gear fixed to said drive shaft for rotation therewith; a driven shaft; an arm fixedly connected to said driven shaft extending therefrom, and being perpendicular thereto; a second gear and a plurality of additional gears fixedly connected to each other and being freely turnable on said arm, said second gear meshing with said first gear; a plurality of toothed wheels respectively meshing with said plurality of additional gears; brake means connected to each of said toothed wheels; brake actuating means movable between a plurality of positions and actuating in each of said positions one of said brake means while releasing the others of said brake means; a coupling arm connected to each of said brake means; a plurality of coupling rods, each coupling rod pivotally connected to one of said coupling arms and being movable with the same between a coupling position engaging said brake actuating means and a releasing position releasing said brake actuating means, each of said coupling rods shifting in said coupling position said brake actuating means into a position for actuating the brake means associated with the respective coupling rod; spring means connected to said coupling arms and urging the same to move the associated coupling rod into said releasing position; a plurality of hydraulic servo-motors, each of said servo-motors having a movable member connected to one coupling rod for moving the same to said coupling position; and pump means driven by said drive shaft and adapted to supply an operating fluid to each of said hydraulic servo-motor means so that the same exert on the respective coupling arm a force depending on the rotary speed of said drive shaft.

4. An automatic transmission and speed changing mechanism, comprising, in combination, a drive shaft; a first gear fixed to said drive shaft for rotation therewith; a driven shaft; an arm fixedly connected to said driven shaft extending therefrom, and being perpendicular thereto; a second gear and a plurality of additional gears fixedly connected to each other and being freely turnable on said arm, said second gear meshing with said first gear; a plurality of toothed wheels respectively meshing with said plurality of additional gears; brake means connected to each of said toothed wheels; a brake actuating crank shaft means having a plurality of cranks, one crank for each of said brake means; connecting means connecting each of said cranks to one of said brake means, said brake actuating crank shaft means being movable between a plurality of positions and actuating in each of said positions one of said brake means while releasing the others of said brake means; a coupling arm connected to each of said brake means; a plurality of coupling rods, each coupling rod pivotally connected to one of said coupling arms and being movable with the same between a coupling position engaging the associated crank of said brake actuating crank shaft means and a releasing position releasing the associated crank of said brake actuating crank shaft means, each of said coupling rods shifting in said coupling position said brake actuating crank shaft means into a position for actuating the brake means associated with the respective coupling rod; spring means connected to said coupling arms and urging the same to move the associated coupling rod into said releasing position; a plurality of hydraulic servo-motors, each of said servo-motors having a movable member connected to one coupling rod for moving the same to said coupling position; and pump means driven by said drive shaft and adapted to supply an operating fluid to each of said hydraulic servo-motor means so that the same exert on the respective coupling arm a force depending on the rotary speed of said drive shaft.

5. An automatic transmission and speed changing mechanism, comprising, in combination, a drive shaft; a first gear fixed to said drive shaft for rotation therewith; a driven shaft; an arm fixedly connected to said driven shaft extending therefrom, and being perpendicular thereto; a second gear and a plurality of additional gears fixedly connected to each other and being freely turnable on said arm, said second gear meshing with said first gear; a plurality of toothed wheels respectively meshing with said plurality of additional gears; brake means connected to each of said toothed wheels; brake actuating means movable between a plurality of positions and actuating in each of said positions one of said brake means while releasing the others of said brake means; a coupling arm connected to each of said brake means; a plurality of coupling rods, each coupling rod pivotally connected to one of said coupling arms and being movable with the same between a coupling position engaging said brake actuating means and a releasing position releasing said brake actuating means, each of said coupling rods shifting in said coupling position said brake actuating means into a position for actuating the brake means associated with the respective coupling rod; spring means connected to said coupling arms and urging the same to move the associated coupling rod into said releasing position; a plurality of electro-magnetic servo-motors, each of said servo-motors having a movable member connected to one coupling rod for moving the same to said coupling position; and electric generator means driven by said drive shaft and connected to said electro-magnetic servo-motors to energize the same so that the same exert on the respective coupling arm a force depending on the rotary speed of said drive shaft.

References Cited in the file of this patent

UNITED STATES PATENTS

| 1,333,729 | Pollard | Mar. 16, 1920 |
| 1,797,982 | Gessner | Mar. 24, 1931 |

FOREIGN PATENTS

| 31,841 | Netherlands | Jan. 15, 1934 |